US010379679B2

(12) United States Patent
Mei (10) Patent No.: US 10,379,679 B2
(45) Date of Patent: Aug. 13, 2019

(54) MOVABLE ROBOT CAPABLE OF PROVIDING A PROJECTED INTERACTIVE USER INTERFACE (71) Applicant: Junfeng Mei, Sunnyvale, CA (US)

(72) Inventor: Junfeng Mei, Sunnyvale, CA (US)

(73) Assignee: Junfeng Mei, Sunnyvale, CA (US)

( * ) Notice: Subject to any disclaimer, the term of this patent is extended or adjusted under 35 U.S.C. 154(b) by 0 days.

(21) Appl. No.: 15/911,087

(22) Filed: Mar. 3, 2018

(65) Prior Publication Data
US 2018/0364870 A1 Dec. 20, 2018

(30) Foreign Application Priority Data
Jun. 19, 2017 (CN) .......................... 2017 1 0464481

(51) Int. Cl.
| G06F 3/042 | (2006.01) |
| G06K 9/00 | (2006.01) |
| B25J 5/00 | (2006.01) |
| B25J 9/16 | (2006.01) |
| B25J 9/00 | (2006.01) |
| G05D 1/02 | (2006.01) |

(Continued)

(52) U.S. Cl.
CPC ............ *G06F 3/0425* (2013.01); *B25J 5/007* (2013.01); *B25J 9/0003* (2013.01); *B25J 9/161* (2013.01); *B25J 9/162* (2013.01); *B25J 9/1666* (2013.01); *B25J 9/1697* (2013.01); *G05D 1/0238* (2013.01); *G05D 1/0276* (2013.01); *G06F 3/017* (2013.01); *G06F 3/0304* (2013.01); *G06K 9/00335* (2013.01); *G06K 9/00664* (2013.01); *G06F 2203/012* (2013.01); *G06K 2209/21* (2013.01); *Y10S 901/01* (2013.01); *Y10S 901/47* (2013.01)

(58) Field of Classification Search
CPC ................. Y10S 901/01; Y10S 901/47; G05D 2201/0203; G05D 1/0274; G05D 1/0246; G05D 1/0238; B25J 9/1666; B25J 19/021; B25J 9/0003; B25J 11/0015; B25J 9/162; G06F 3/0425; G06F 3/017
See application file for complete search history.

(56) References Cited

U.S. PATENT DOCUMENTS

| 2006/0041333 A1* | 2/2006 | Anezaki ............. G06K 9/00201 700/259 |
| 2015/0362921 A1* | 12/2015 | Hanaoka ................ G01B 11/24 701/23 |
| 2018/0279847 A1* | 10/2018 | Park ..................... G05D 1/0027 |

* cited by examiner

*Primary Examiner* — Gerald Johnson
(74) *Attorney, Agent, or Firm* — SV Patent Service (57) ABSTRACT The present invention discloses a moveable robot that includes a head, a main body, and a moving chassis. A transport mechanism is mounted on the lower part of the moving chassis. The head and the main body are carried by moving chassis. A moveable connection mechanism between the main body and the moving chassis enables relative movements between the two components. A sliding platform comprising a sliding mechanism between the head and the main body allows the head to move relative to the main body. A projection system can a display an image through a window in the head, and to project an interactive map on the ground. An optical sensing system can detect movements of users relative to the displayed map on the ground. The projection system and the optical sensing system in combination provides an interactive user interface for the users. The optical sensing system can also sense the environment to assist obstacle avoidance and route planning moveable robot.

12 Claims, 10 Drawing Sheets (51) Int. Cl.
*G06F 3/01* (2006.01)
*G06F 3/03* (2006.01)

MOVABLE ROBOT CAPABLE OF PROVIDING A PROJECTED INTERACTIVE USER INTERFACE

BACKGROUND OF THE INVENTION

The present application relates to robotic technologies, and in particular, to a robot having a novel mechanism for providing an interactive user interface.

Robotic technologies have seen a revival in recent years. Various robots are being developed for a wide range of applications such as care of senior citizens and patients, security and patrol, delivery, hotel services, and hospitality services. Typically, the robots not only need to independently move around a service area; they are also required to deliver messages to and receive commands from people. It has been a challenge to provide technologies that can effectively fulfill the above needs with simple and low-cost components and designs. With domestic technology on the rise, the quantity and complexity of social robots are becoming an important interaction design challenge to promoting the user's sense of control and engagement. Additionally, a wide range of interaction modalities for the social robots have been designed and researched, including GUI, voice control, gesture input, and augmented reality interfaces.

Social robots provide for an alternative mode of interaction, a way to simulate the way of communication between humans or between human and a pet using gestures and nonverbal behavior. Furthermore, by sharing physical space and objects with their users, people like to involve physical action on the part of the human for more user experience, better learning and higher engagement.

Other major social robot is to accompany 0-6 year old kids at home or a kindergarten. At this period of ages, kids are not good at verbal communication; instead they prefer physical body languages. There is therefore a need for a robot that can effectively interact with users and deliver content at a place and a time convenient to the users.

SUMMARY OF THE INVENTION

The presently application discloses a moveable robot having simple multi-purpose mechanisms for movement and user interface. A multi-purpose projection system can display an image with a body of the moveable robot, or project an image served as an interactive user interface on an external surface. A multi-purpose optical sensing system can detect objects in the environment as well as detecting user's movement, location, and gesture for receiving user inputs.

In one general aspect, the present invention relates to a moveable robot, comprising: a processing control system; a projection system that can project a first image on a surface outside the body of the moveable robot; an optical sensing system that can detect the user's movement, location, or gesture over the first image, wherein the processing control system can interpret user's inputs based on the user's movement, location or gesture over the first image projected on the surface outside the body of the moveable robot, wherein the optical sensing system can detect objects surrounding the moveable robot; and a transport system that can produce motion relative to the surface to plan its moving path or avoid the objects detected by the optical sensing system.

Implementations of the system may include one or more of the following. The moveable robot can further include a main housing body; an upper housing body comprising an optical window at a lower surface, wherein at least a portion of the project system is inside the upper housing body; a sliding platform comprising a sliding mechanism that can slide the upper housing body relative to the main housing body to expose a lower surface of the upper housing body, wherein the project system can emit light through the optical window at the lower surface of the upper housing body to project the first image on a surface outside the body of the moveable robot. The sliding mechanism can slide the upper housing body to a home position and a slide-out position, wherein the projection system is configured to display the second image on or inside a body of the moveable robot when the upper housing body is at the home position, wherein the projection system can project the first image on a surface outside the body of the moveable robot when the upper housing body is at the slide-out position. The moveable robot can further include a rotation mechanism that can rotate the main housing body relative to the transport system. The projection system can include a projector configured to produce images; a mirror configured to reflect the images; and a steering mechanism configured to align the mirror to a first angle to produce the first image, and to align the mirror to a second angle to produce the second image. The projection system can display a second image on or inside a body of the moveable robot. The second image can a two-dimensional image formed on a surface. The second image can be a three-dimensional image formed inside the moveable robot. The optical sensing system can emit light beams to an object or a person and detect light reflected from the object or the person, wherein the processing control system can calculate locations of the objects based on the reflected lights. The optical sensing system can include a camera that detects light reflected from the surface where the first image is formed to detect the user's movement, location, or gesture over the first image. The optical sensing system can include an IR emitter and a depth camera configured to sense user's movement, location or gesture and the objects surrounding the moveable robot. The optical sensing system can include a laser emitter and a rotating mirror configured to sense user's movement, location or gesture and the objects surrounding the moveable robot.

These and other aspects, their implementations and other features are described in detail in the drawings, the description and the claims.

DETAILED DESCRIPTION OF THE INVENTION

Figure 1:
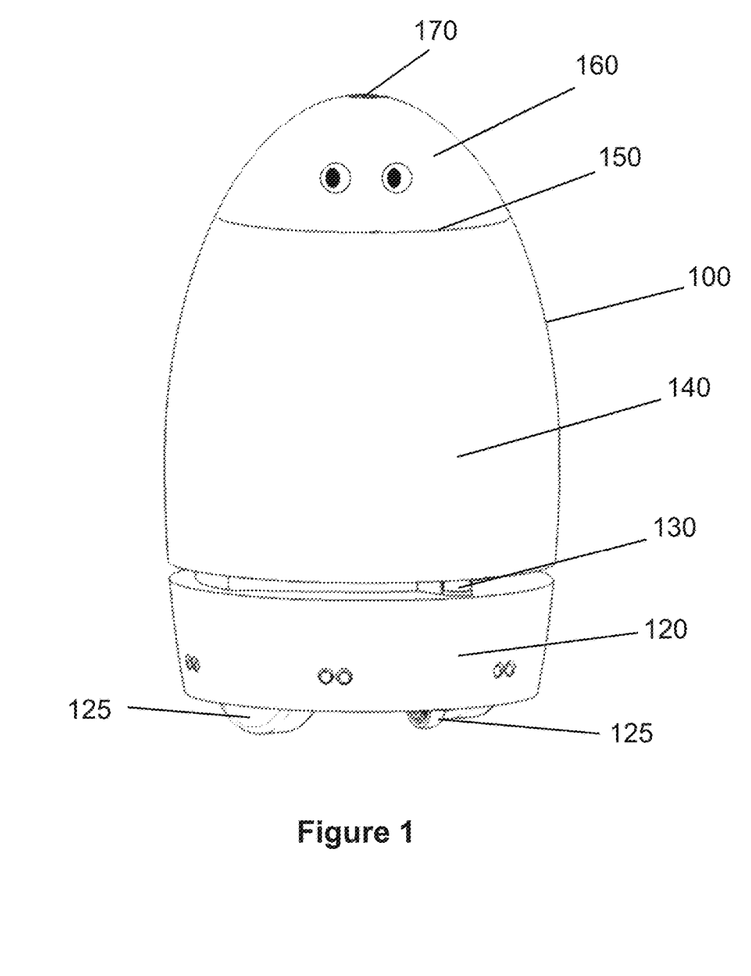
FIG. 1 shows a front view of a moveable robot in accordance with the present application.
Figure 2:
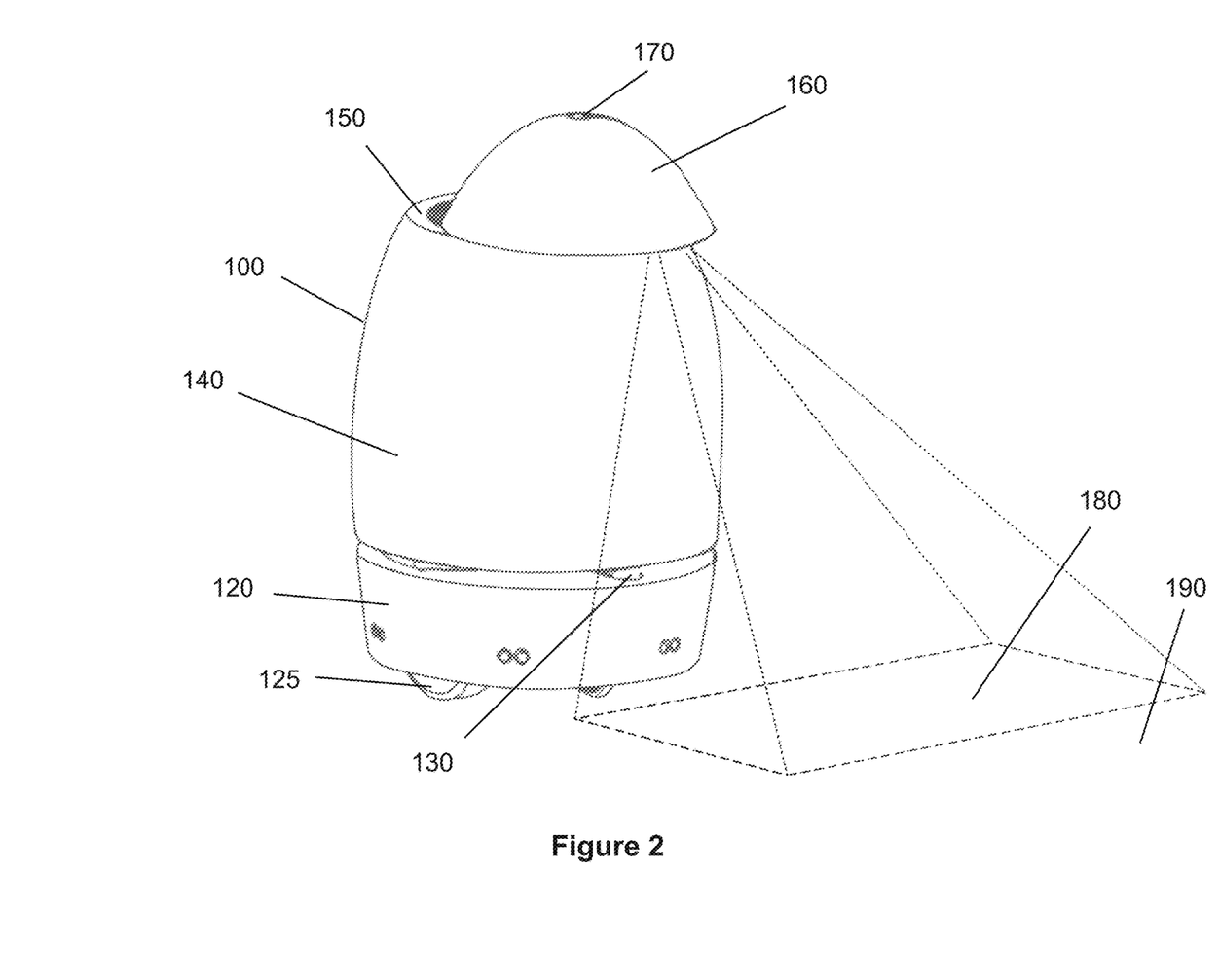
FIG. 2 shows a front view of a moveable robot in a configuration for projecting an image on the ground in accordance with the present application.

Referring to FIGS. 1 and 2, a moveable robot 100 includes a transport platform 120, an optical sensing system 130, a main housing body 140, a sliding platform 150, an upper housing body 160, and a microphone 170 in the upper housing body 160. The transport platform 120 includes a transport mechanism including wheels 125, which can move the moveable robot 100 to different locations. The main housing body 140 and the transport platform 120 are connected by a rotation mechanism that allows the main housing body 140 to rotate relative to the transport platform 120 so that components in the main housing body 140 and the upper housing body 160 can detect people and objects in the environment and display information and interact with people in the right directions.

The optical sensing system 130 can detect objects in the environment and assist the moveable robot 100 to design the best movement path and to avoid obstacles during movement. For example, the optical sensing system 130 can emit laser beams to the environment, receive bounced back laser signals, and detect objects and their locations by analyzing the bounced back signals. As described below, an important aspect of the presently disclosed robot is that the optical sensing system 130 can also detect user's movements, locations, and gestures over a projected user interface.

The sliding platform 150 enables the upper housing body 160 to slide relative to the main housing body 140 to expose a lower surface of the upper housing body 160. A project system (400, 610 in FIGS. 4 and 7, described below) can project a project image 180 on a surface 190 that the moveable robot 100 stands on. The surface can be a ground surface, a floor surface, a work platform, a tabletop, etc.

Figure 3:
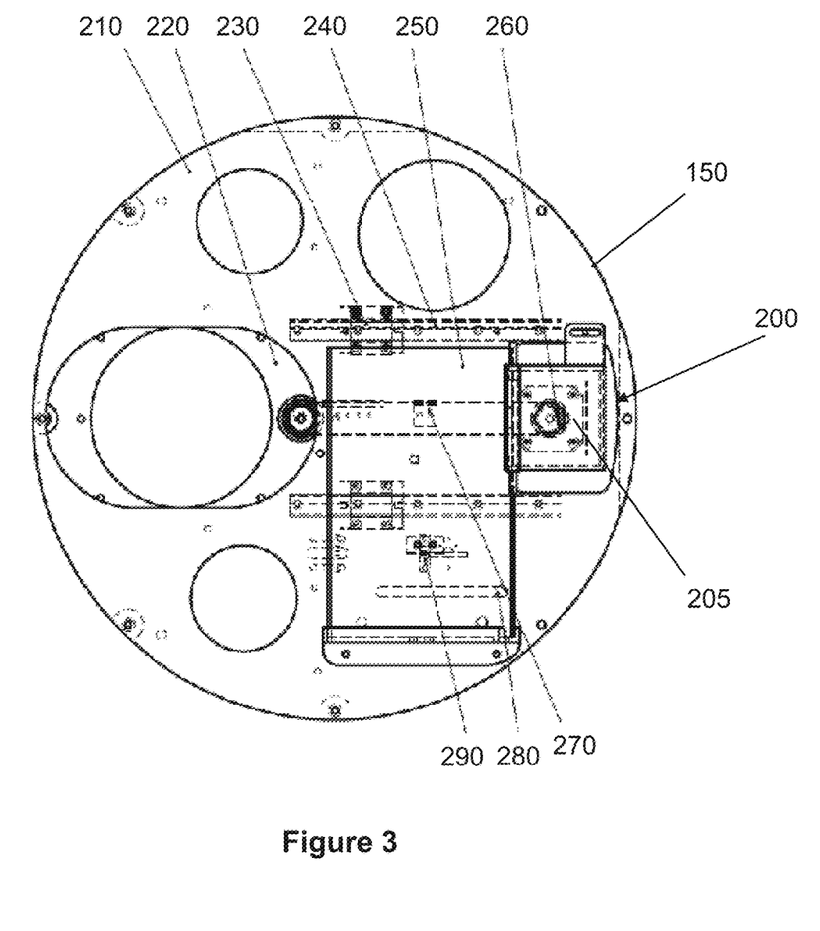
FIG. 3 is a bottom view of the upper housing body showing a sliding platform comprising a sliding mechanism between the head and the main body of the moveable robot in FIGS. 1 and 2.

Referring to FIGS. 1-3, the sliding platform 150 includes a sliding mechanism 200 that includes a motor, a drive, a controller, a power supply, and mechanical components. The sliding platform 150 includes an optical window 205 for the projection optical path of the projection system (400, FIG. 4A).

In some embodiments, as shown in FIG. 3, the sliding mechanism 200 can further include a projector sliding plate 210, a projector sliding reference plate 220, a sliding block 230, a sliding rail 240, a pulley transmission mechanism 260, a timing belt locking bridge 270, a travel limit column 280, and a photoelectric sensor 290. The sliding mechanism 200 has two states: a home position and a slide-out position, whose positions are sensed by the photoelectric sensor 290 and locked by the travel limit column 280. The slide rail 240, the timing pulley drive mechanism 260, the travel limit column 280, and the photoelectric sensor 290 are mounted on the projector slide reference plate 220. The slide block 230 and the timing belt lock clamp 270 are installed on the projector sliding plate 210. The projector sliding plate 210 is further provided with a device for fixing the projector 250. In the present implementation, at least one slide/slide-fit structure is provided; the projector sliding plate 210 is sleeved on the slide rail 240 by the slide block 230. The timing belt locking bridge 270 is connected to the belt of the pulley transmission mechanism 260. The driving pulley of the pulley transmission mechanism 260 is fixedly connected with the rotor shaft of a motor mounted on the projector sliding reference plate 220. The stroke limiting post 280 engages with the notch on the projector slide-out plate 210. The motor can be implemented using a DC motor.

The pulley transmission mechanism 260 can include a driving pulley, a driven pulley, a belt, and a timing belt clamping plate 270. When the sliding mechanism 200 is in operation, the motor rotates according to the instruction sent by a processing control system (620 in FIG. 6, described below), drives the driving wheel to rotate, the driving wheel drives the belt to move left and right, the belt drives the synchronous belt clamping plate 270 to slide around, the synchronous wheel clamping plate 270. The projector slides out of the board 210 and the projector 250 can slide corresponding to the left and right of the belt.

Figure 4A:
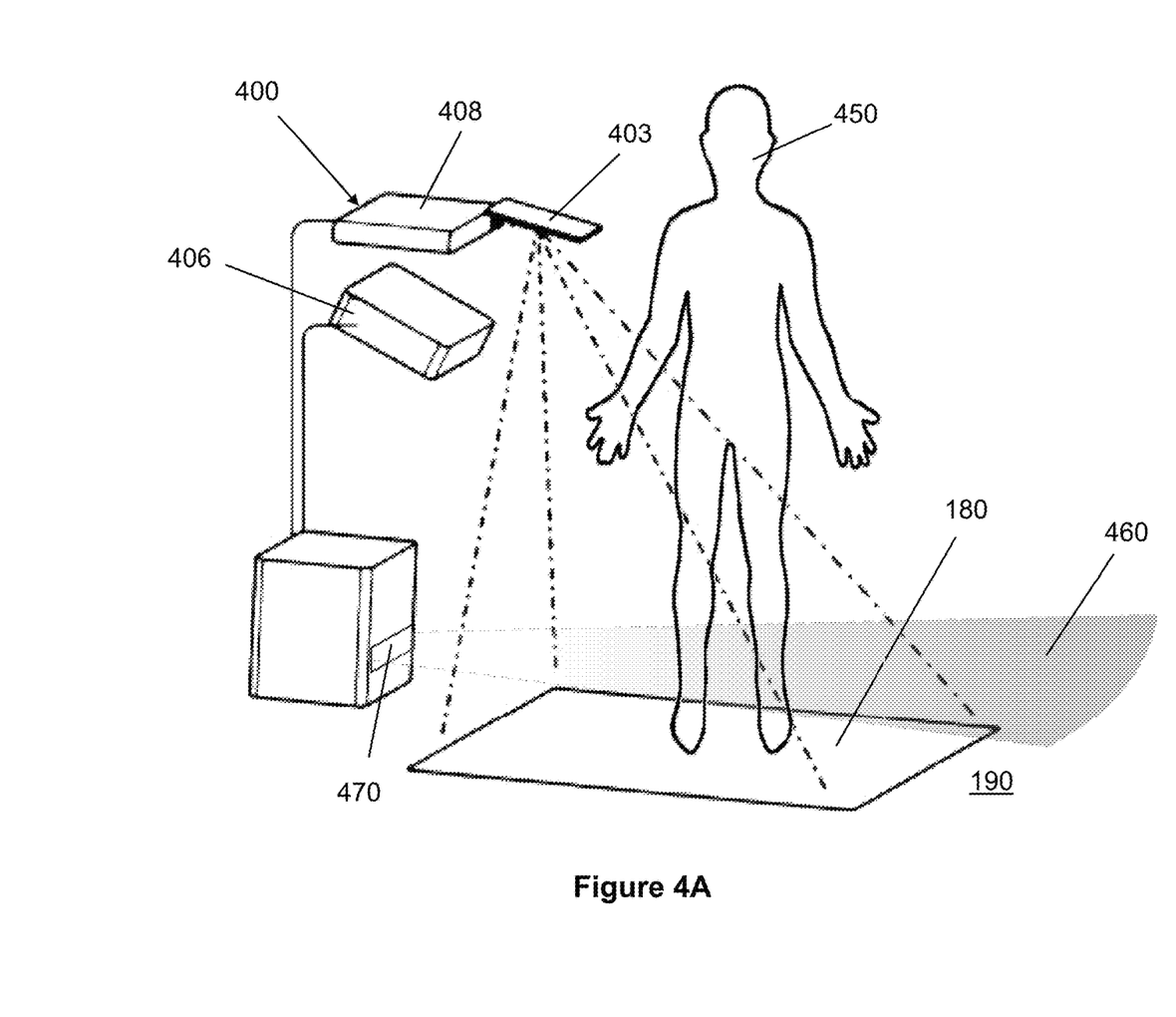
FIG. 4A is a schematic diagram illustrating the sensing system in the moveable robot in accordance with the present application.
Figure 5A:
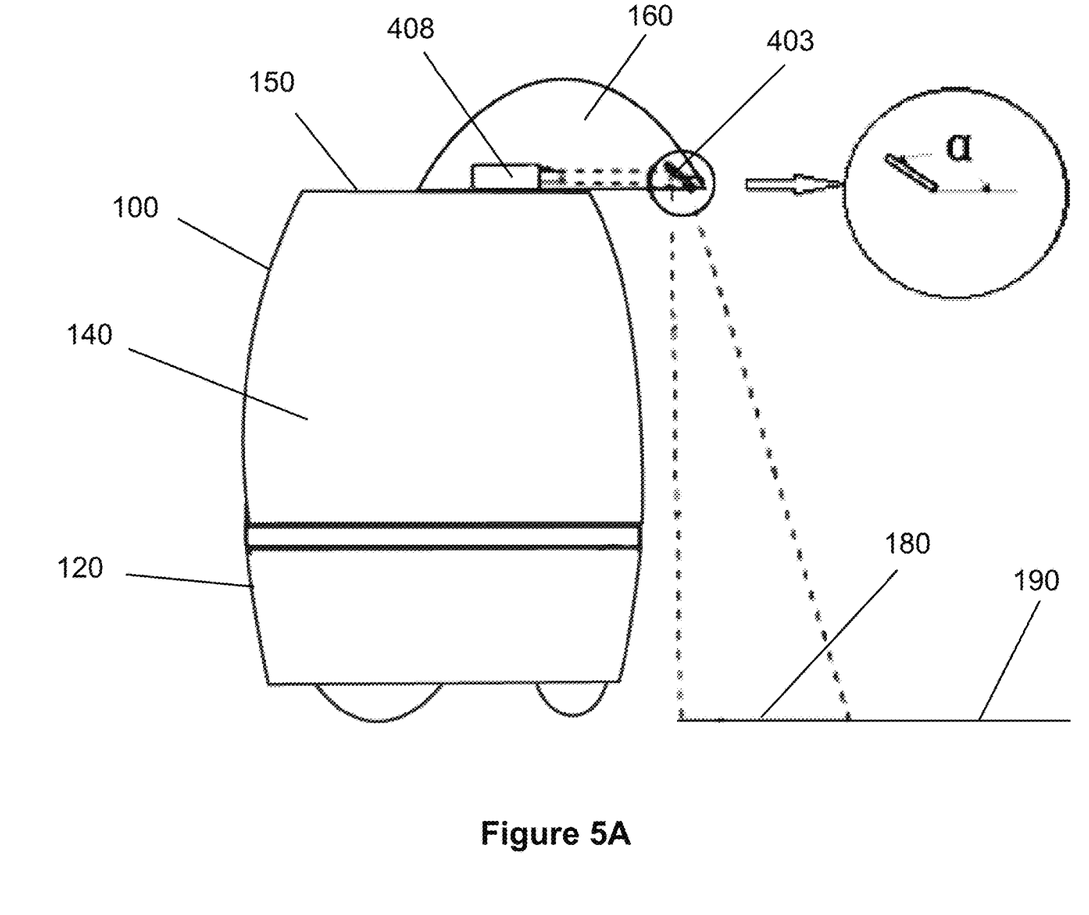
FIG. 5A shows a configuration of the projection system in the disclosed moveable robot for projecting an image on the surface as a part of an interactive user interface.

Referring to FIGS. 4A and 5A, the moveable robot 100 includes a projection system 400 that includes a mirror 403 and a projector 408 in the upper housing body (160 in FIGS. 1 and 2). The mirror 403 can rotate with a steering mechanism (not shown in figures) to change the angle of the mirror 403 relative to the ground 190 such that the projector 408 can project, via the mirror 403, the image 180 on the surface 190. One purpose of the mirror 403 can allow more flexibility for the projector 408 to be installed in very limited upper housing body 160. If the upper housing body 160 is big enough and a slim projector 408 can be found, the mirror 403 and the steering mechanism can be optional. The image 180 can include common features of an interactive user interface such as a border, functional symbols, selection buttons, a grid, a table, text and graphics, etc. The image 180 can also include product and other commercial information. A camera 406 is installed on the upper position in the moveable robot 100, which can detect the bounced lights from the surface 190 comprising user 450's movement over the image 180.

Referring to FIGS. 2-3, the components of the sliding mechanism 200 (except for the slide rail 240, FIG. 3), the projector 408 and the mirror 403 can be mounted in the upper housing body 160. As the upper housing body 160 is shifted relative to the main housing body 140 (shown in FIG. 2), the optical window 205 for the projection optical path is exposed at the bottom of the upper housing body 160. An image produced by the projector 408 is reflected by the mirror 403. The steering mechanism changes the angle α of the mirror 403 relative to the surface 190, to direct the light to casts on the surface 190 to form a projected image 180.

In accordance with an important aspect of the present application, the project image 180 can provide a user interface that includes functional input areas. A user 450 can move about the project image 180 and produce gestures at different functional input areas. The optical sensing system 130 has dual functions: in addition to detecting objects in the environment, it can detect user's movements, locations, and gestures and interpret them as inputs to the processing control system (620 in FIG. 6, described below). The laser optical sensing system 470 can emit a light beam 460, which is reflected and bounced off from surrounding objects or by a user. The camera 406 is installed on the upper position in the moveable robot 100, which can detect the bounced lights from the surfaces. The processing control system (620 in FIG. 6, described below) conducts computations to calculate the positions and distances of the surrounding objects, or user's movement, location, or gesture.

In some embodiments, LIDAR (light detection and ranging) can be used as sensors for both sensing human movement for interaction purpose and building the mapping to move in a complex environment. Lidar is a surveying method that measures distance to a target by illuminating the target with pulsed laser light and measuring the reflected pulses with a sensor. Differences in laser return times and wavelengths can then be used to make digital 2D or 3D representations of the target. Time-of-flight (TOF) cameras are sensors that can measure the depths of scene-points, by illuminating the scene with a controlled laser or LED source, and then analyzing the reflected light. The ability to remotely measure range is extremely useful and has been extensively used for mapping and surveying.

Figure 4B:
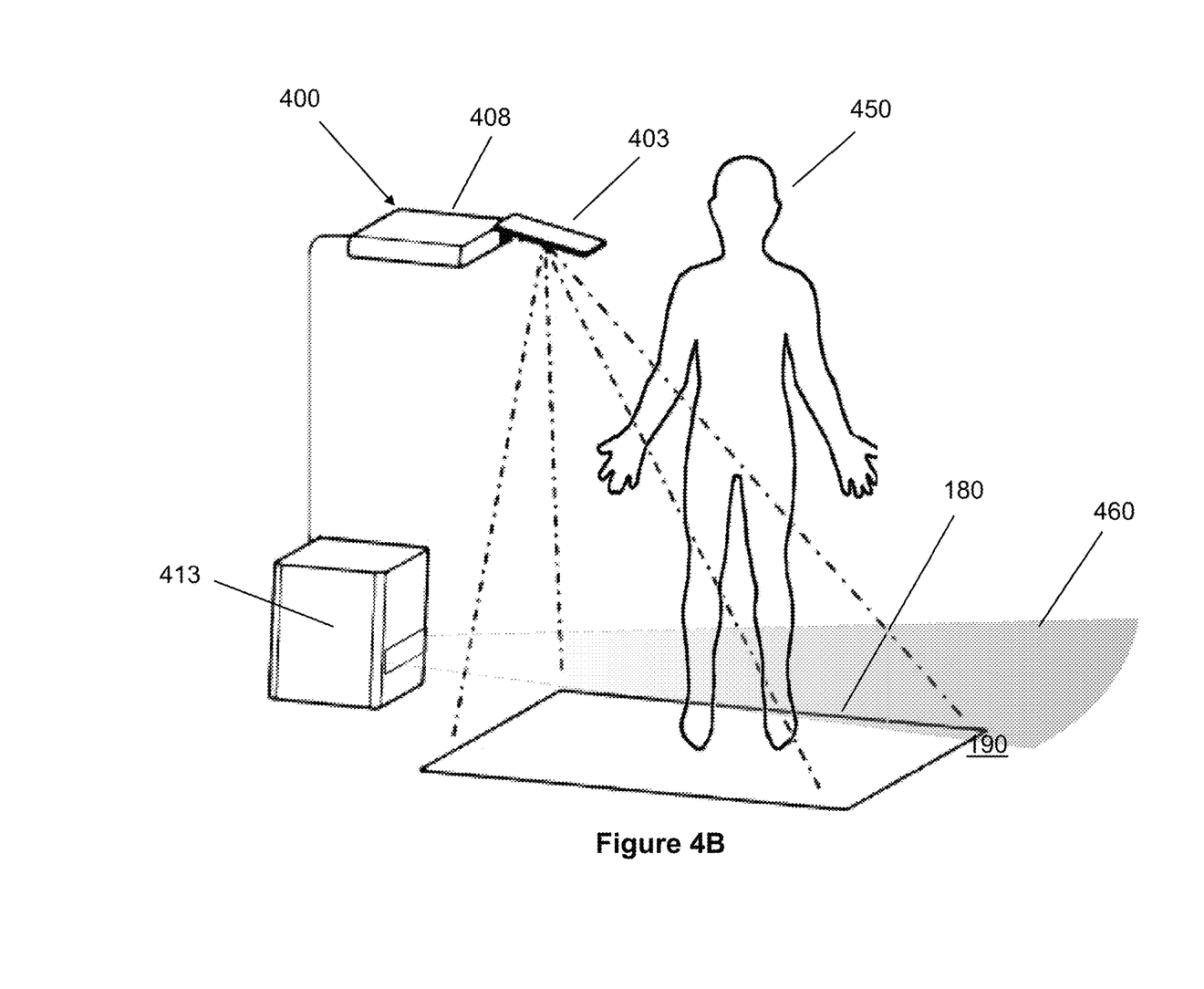
FIG. 4B is a schematic diagram illustrating an exemplified sensing system in the moveable robot in accordance with the present application.

One type of LIDAR system uses a single laser or multiple line laser fire onto a rotating mirror spinning at high speed and hence to view objects in a single plane or multiple planes at different heights, a 360o field of view is generated. As shown in FIG. 4B, a 3D image sensing system 413 comprising a spinning mirror for scanning laser beam can sense all the objects in its plane to detect objects in the environments and user movement.

Figure 4C:
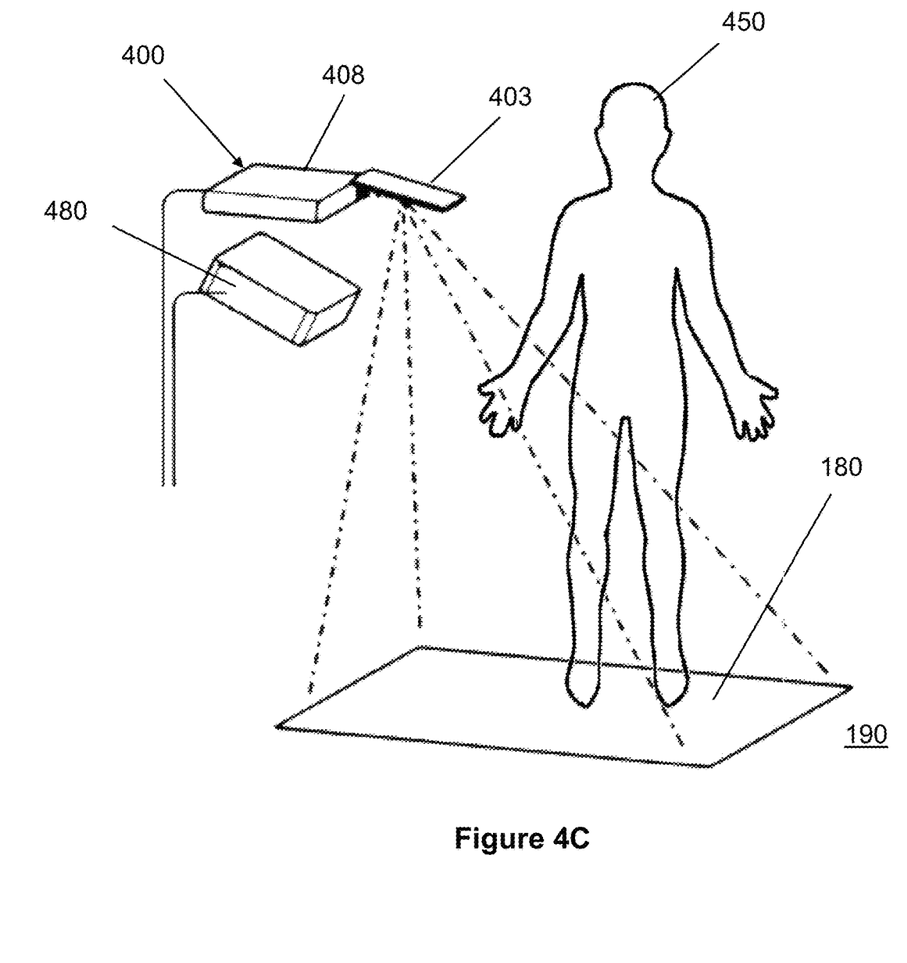
FIG. 4C is a schematic diagram illustrating another exemplified sensing system in the moveable robot in accordance with the present application.

Another type of LIDAR system includes IR emitter and depth camera. IR emitter projects a pattern of infrared light. As the light hits a surface, the pattern becomes distorted and the depth camera reads the distortion. The depth camera analyzes IR patterns to build a 3D map of the room and peoples action within it. As shown in FIG. 4C, a 3D image sensing system 480 comprising an IR emitter and a depth camera can view all the objects in its range to detect environments and user movement.

The optical sensing system using LIDAR can fulfill two functions: 1. building a map for the complex environment for robot to plan it path through obstacles; 2. collecting the body movement of humans relating to the position of the projected image on the surface and analyze the motion to activate corresponding response. In this case, one component of LIDAR can replace both the camera 406 and the optical sensing system 130 because it usually integrates the light emitter and sensor into one component.

Figure 5B:
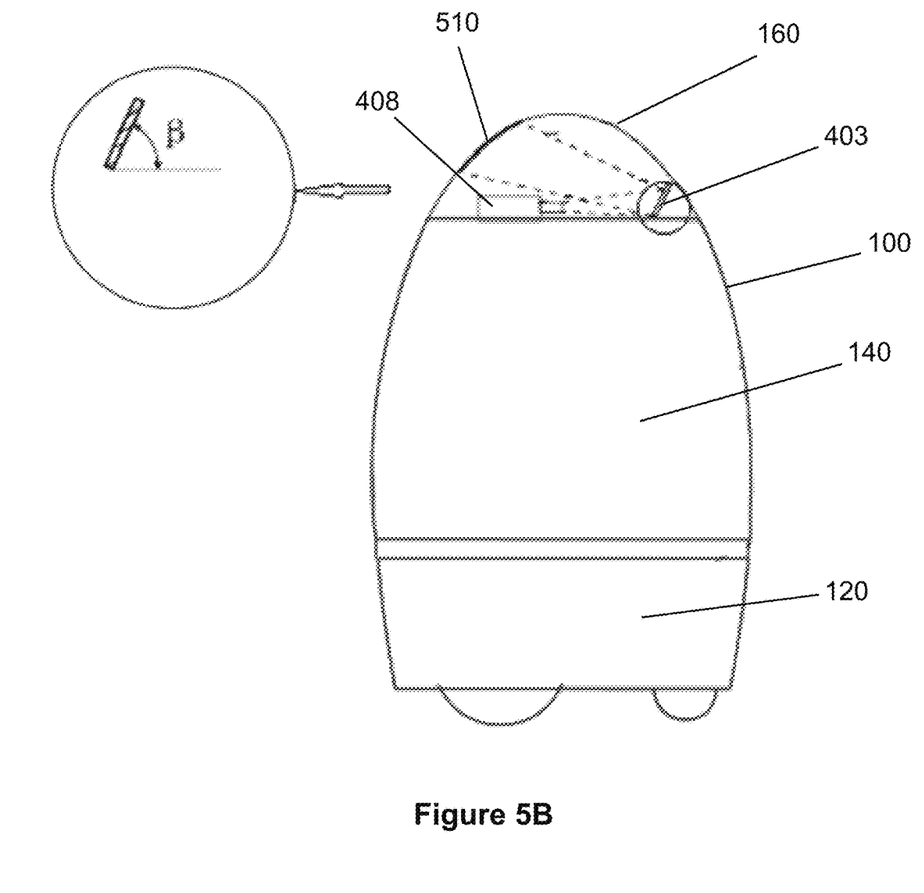
FIGS. 5B and 5C respectively show two display configurations for the projection system compatible with the disclosed moveable robot.
Figure 5C:
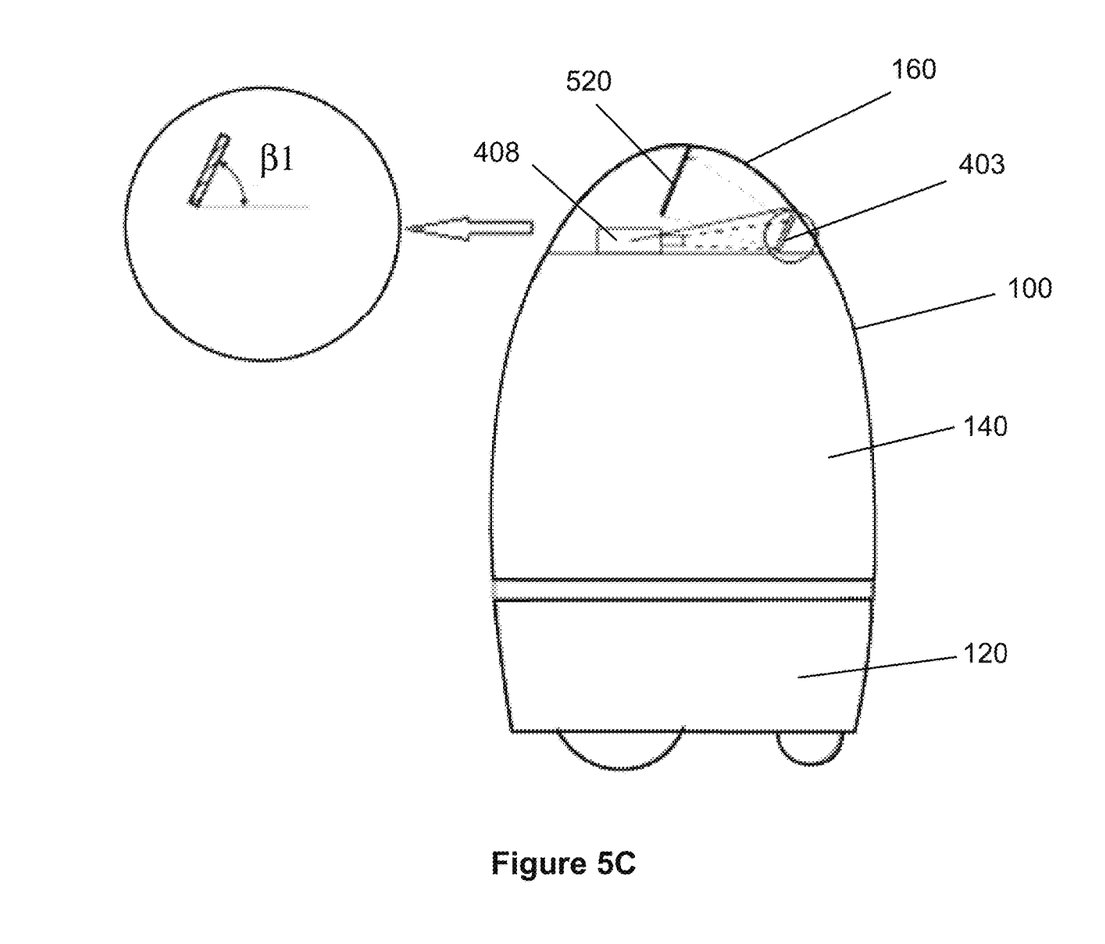

In some embodiments, the projection system 400 can display images on a surface of the upper housing body 160 or inside the upper housing body 160 while the upper housing body 160 is at its home position. Referring to FIG. 5B, the upper housing body 160 includes a winder 510. The angle β of the mirror 403 relative to the surface 190 (FIG. 5B) is adjusted by the steering mechanism. An image is projected and displayed at the winder 510 viewable by users. Moreover, referring to FIG. 5C, the angle β1 of the mirror 403 relative to the surface 190 (FIG. 5A) is adjusted by the steering mechanism. An image is projected and displayed on a holographic film 520 inside the upper housing body 160. Alternatively, a three-dimensional hologram image is formed inside the upper housing body 160 by the projection system 400. The image on the holographic film 520 or the hologram image can be viewed by a user through a transparent window in the upper housing body 160.

Figure 6:
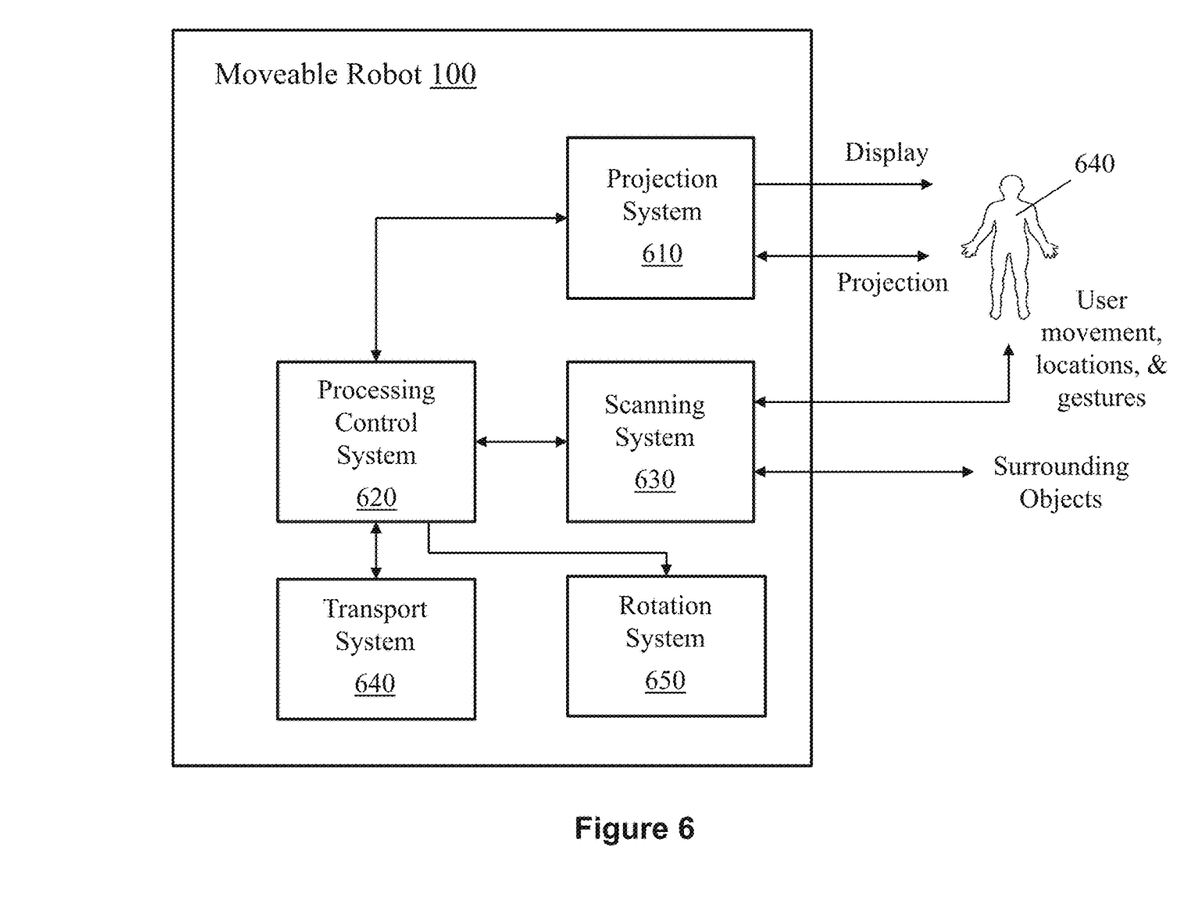
FIG. 6 is a system diagram of the moveable robot in accordance with the present application.

FIG. 6 shows a system diagram of the moveable robot in accordance with the present application. The moveable robot 100 includes a projection system 610, a processing control system 620, an optical sensing system 630, a transport system 640, and a rotation mechanism 650. The project system 610 can display two-dimensional images or three-dimensional holograms in the upper housing body 160, viewable by users under the control of the processing control system 620. The project system 610 can also project an image on a surface outside of in the upper housing body 160 under the control of the processing control system 620. The projected image is not only viewable by users, but also serves as an interactive user interface for taking input from users. Under the control of the processing control system 620, the optical sensing system 630 can not only scan and determine locations of objects in the environment (for motion path planning and object avoidance during movement); it can also detect user's movement, locations, and gestures over the project area, which are interpreted as user inputs by the processing control system 620. The processing control system 620 can also controls a rotation mechanism 650 to rotate the main housing body (140, FIGS. 1-2, 5-6B) relative to the transport platform (120, FIGS. 1-2, 5-6B).

It should be noticed that the above examples are intended to illustrate the concept of the present invention. The present invention may be compatible with many other configurations and variations: for example, the shape of the moveable robot is not limited to the examples illustrated. In addition, the moveable robot can include fewer or additional housing bodies. For example, the main housing body and the transport platform can be combined and the rotation of the robot relative to the ground surface can be accomplished by the transport mechanism in the transport platform rather than accomplished by a separate rotation mechanism. Furthermore, the sliding mechanism can be realized by other mechanical and electronic components. Moreover, the optical scanning system can be implemented in other configurations to provide the capability of sensing both an object and a person's location, movements, and gestures.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention.

What is claimed is:

1. A moveable robot, comprising:
   a processing control system;
   a projection system is configured to project a first image on a surface outside a body of the moveable robot and to display a second image on or inside the body of the moveable robot;
   an optical sensing system configured to detect the user's movement, location, or gesture over the first image projected on the surface outside the body of the moveable robot,
   wherein the processing control system is in communication with the optical sensing system and configured to obtain user's inputs based on the user's movement, location or gesture relative to the first image projected on the surface outside the body of the moveable robot,
   wherein the optical sensing system is configured to detect objects surrounding the moveable robot; and
   a transport system configured to produce a movement on the surface in a moving path that avoids the objects detected by the optical sensing system.

2. The moveable robot of claim 1, further comprising:
a main housing body;
an upper housing body comprising an optical window at a lower surface, wherein at least a portion of the project system is inside the upper housing body;
a sliding platform comprising a sliding mechanism configured to slide the upper housing body relative to the main housing body to expose a lower surface of the upper housing body, wherein the project system is configured to emit light through the optical window at the lower surface of the upper housing body to project the first image on a surface outside the body of the moveable robot.

3. The moveable robot of claim 2, wherein the sliding mechanism is configured to slide the upper housing body to a home position and a slide-out position, wherein the projection system is configured to project the first image on a surface outside the body of the moveable robot when the upper housing body is at the slide-out position.

4. The moveable robot of claim 3, wherein the projection system is configured to display the second image on or inside the upper housing body of the moveable robot when the upper housing body is at the home position.

5. The moveable robot of claim 1, wherein the projection system comprises:
a projector configured to produce images;
a mirror configured to reflect the images; and
a steering mechanism configured to align the mirror to a first angle to produce the first image, and to align the mirror to a second angle to produce the second image.

6. The moveable robot of claim 1, further comprising:
an upper housing body that houses at least a portion of the project system inside,
wherein the projection system is configured to display the second image inside the upper housing body of the moveable robot.

7. The moveable robot of claim 6, wherein the second image is a two-dimensional image formed on a holographic film.

8. The moveable robot of claim 6, wherein the second image is a three-dimensional image formed inside the moveable robot.

9. The moveable robot of claim 1, wherein the optical sensing system is configured to emit light beams to an object or a person and detect light reflected from the object or the person, wherein the processing control system is configured to calculate locations of the objects based on the reflected lights.

10. The moveable robot of claim 9, wherein the optical sensing system includes a camera that detects light reflected from the surface where the first image is formed to detect the user's movement, location, or gesture over the first image.

11. The moveable robot of claim 9, wherein the optical sensing system includes an IR emitter and a depth camera configured to sense user's movement, location or gesture and the objects surrounding the moveable robot.

12. The moveable robot of claim 9, wherein the optical sensing system includes a laser emitter and a rotating mirror configured to sense user's movement, location or gesture and the objects surrounding the moveable robot.

* * * * *